May 2, 1944.  B. F. BUDD  2,347,880
ELECTRODE HOLDER
Filed March 4, 1943
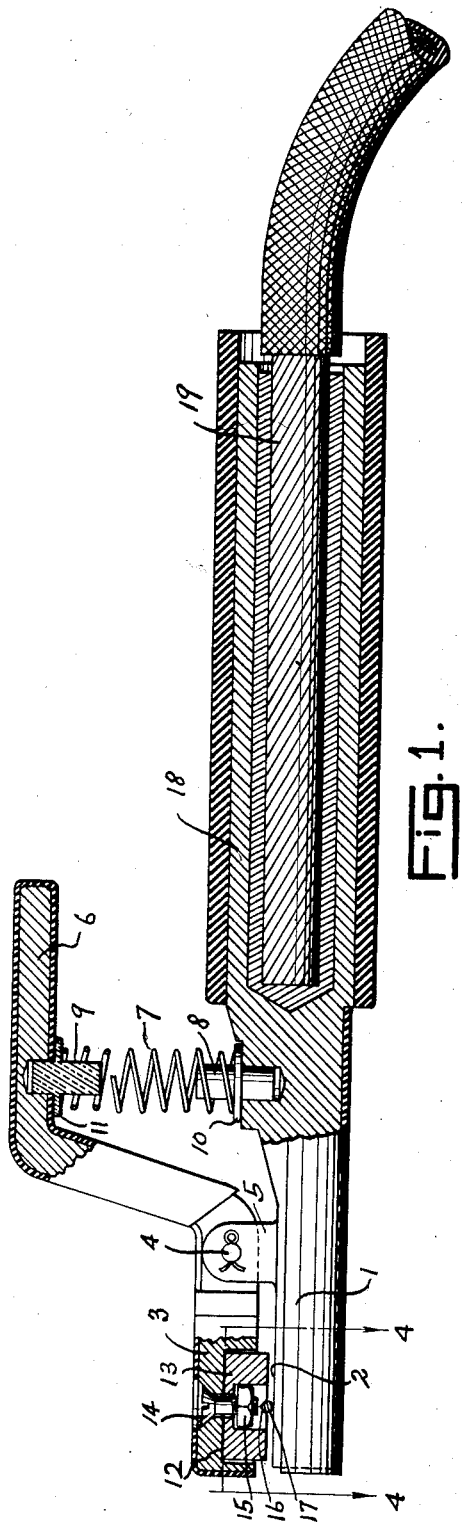
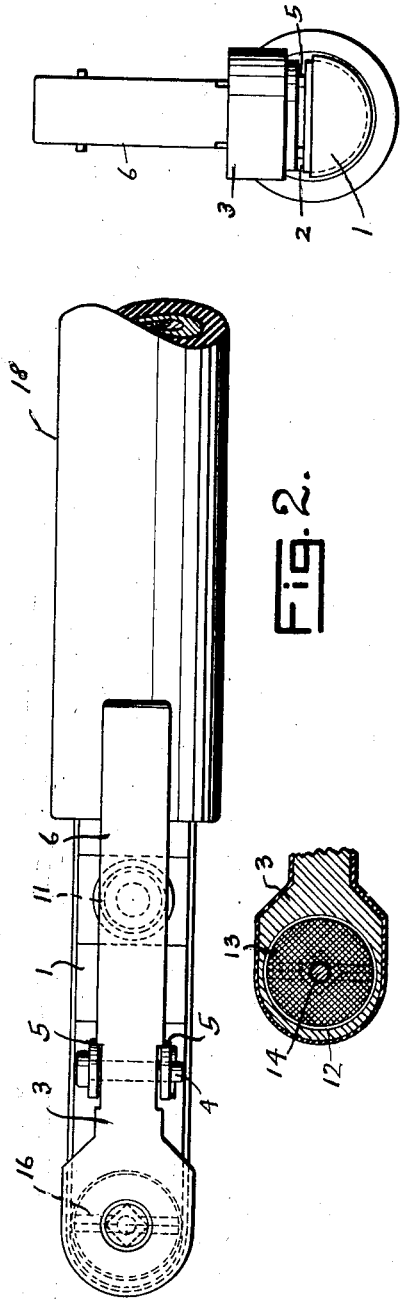
INVENTOR.
Baylis F. Budd
BY  E. V. Hanleway,
ATTORNEY Patented May 2, 1944

2,347,880

UNITED STATES PATENT OFFICE 2,347,880

ELECTRODE HOLDER

Baylis F. Budd, Houston, Tex.

Application March 4, 1943, Serial No. 478,016

4 Claims. (Cl. 219—8)

This invention relates to an electrode holder.

An object of the invention is to provide a holder of the character described which will securely grip and hold the electrode while welding and which will allow the easy adjustment of the electrode into different positions for convenience in carrying on the welding operation.

Another object of the invention is to provide an electrode holder which will be very strong and durable but which is composed of few parts and consequently may be cheaply manufactured, and which is easily operated.

With the above and other objects in view the invention has particular relation to certain novel features of construction, arrangement of parts and use, an example of which is given in this specification and illustrated in the accompanying drawing wherein:

Figure 1 shows a side view partly broken away and partly in section.

Figure 2 shows a fragmentary plan view.

Figure 3 shows an end elevation and

Figure 4 shows a fragmentary sectional view taken on the line 4—4 of Figure 1.

In the drawing the numeral 1 designates a fixed jaw having a smooth gripping face 2 and the numeral 3 designates a pivotally mounted jaw. The jaw 3 is pivoted, by the pin 4, between the ears 5, 5 which stand up from the fixed jaw.

Extending rearwardly from the pivoted jaw there is the grip member 6 whose free end is spaced from the fixed jaw as shown in Figure 1 and interposed between them is a strong coil pressure spring 7.

The fixed jaw 1 and the grip member 6 have the insulating posts 8 and 9 set therein and having the annular washers 10 and 11 against which the corresponding ends of the spring are seated, said posts and washers being formed of insulating material so as to insulate the spring.

The free end of the pivoted jaw 3 is widened, as shown in Figure 1 and the underside thereof is formed with a deep circular socket to snugly receive the circular gripping disc 13 which is preferably formed of copper or bronze. This disc is rotatable about a bolt 14 which is fitted through openings in the jaw 3 and the disc 13 and whose inner end is threaded to receive the nut 15 which is countersunk into the under side of the disc 13.

The under, or exposed, side of the disc 13 projects beyond the corresponding face of the jaw 3 and is provided with a transverse V-notch 16 to receive the end of the electrode 17. When the electrode is inserted in said notch and the grip 6 released the spring 7 will operate to hold said electrode firmly against the plane face 2. The opposite side of the disc 13 should be knurled or roughened as shown in Figure 4 so as to grip the opposing face of the jaw 3 so that the disc will not turn.

As above indicated the disc 13 is fitted snugly in its socket so that it will not move laterally to subject the bolt 14 to undue strain.

When it is desired to adjust the electrode to a different angle the grip member 6 may be slightly depressed to relax the jaws from the electrode and the desired adjustment can then be easily made and the grip member 6 then released.

The fixed grip jaw 1 may be integrally, or otherwise, attached to the handle 18 into which the end of the welding cable 19 is fitted and secured so as to form an electrical connection between the cable and handle in any preferred manner.

The handle, the grip jaws and the grip members 6 are suitably insulated to protect the metal parts from contacting with grounded metal to eliminate short circuiting the current through the holder.

What I claim is:

1. An electrode holder comprising pivotally connected jaws, one of said jaws having a plane face and the other jaw having a circular socket opposite said face, a disc mounted to rotate in said socket and having a transverse groove across its exposed face to receive an electrode and yieldable means acting to hold the electrode in the groove in gripping relation with said face.

2. An electrode holder comprising pivotally connected jaws, a plane gripping face on one of said jaws, the other jaw having a circular socket facing said plane face, a disc fitted snugly in said socket and whose outer side projects beyond the corresponding jaw and is provided with a transverse groove to receive an electrode and yieldable means normally holding the disc in position to clamp the electrode between it and said plane face.

3. An electrode holder comprising pivotally connected jaws, one of said jaws having a gripping face and the other jaw having a circular socket opposite said face, a disc rotatable in said socket, and having a transverse groove across its exposed face to receive an electrode, yieldable means acting to hold the electrode in the groove in gripping relation with said face, the inner face of the disc being in contact with the bottom of the socket and being roughened.

4. An electrode holder comprising a fixed jaw having a smooth gripping face and upstanding ears, a movable jaw pivoted between said ears and having a grip member, a coil spring between the fixed jaw and grip member, the free end of the pivoted jaw being widened and the side thereof facing the fixed jaw having a circular socket, a gripping disc fitted snugly in said socket and pivoted to rotate therein, the exposed side of said disc projecting beyond the corresponding face of the pivoted jaw and being provided with a transverse notch to receive an electrode to be gripped between said disc and face.

BAYLIS F. BUDD.